(No Model.)
S. R. AMES.
WHIFFLETREE.
No. 283,454. Patented Aug. 21, 1883.
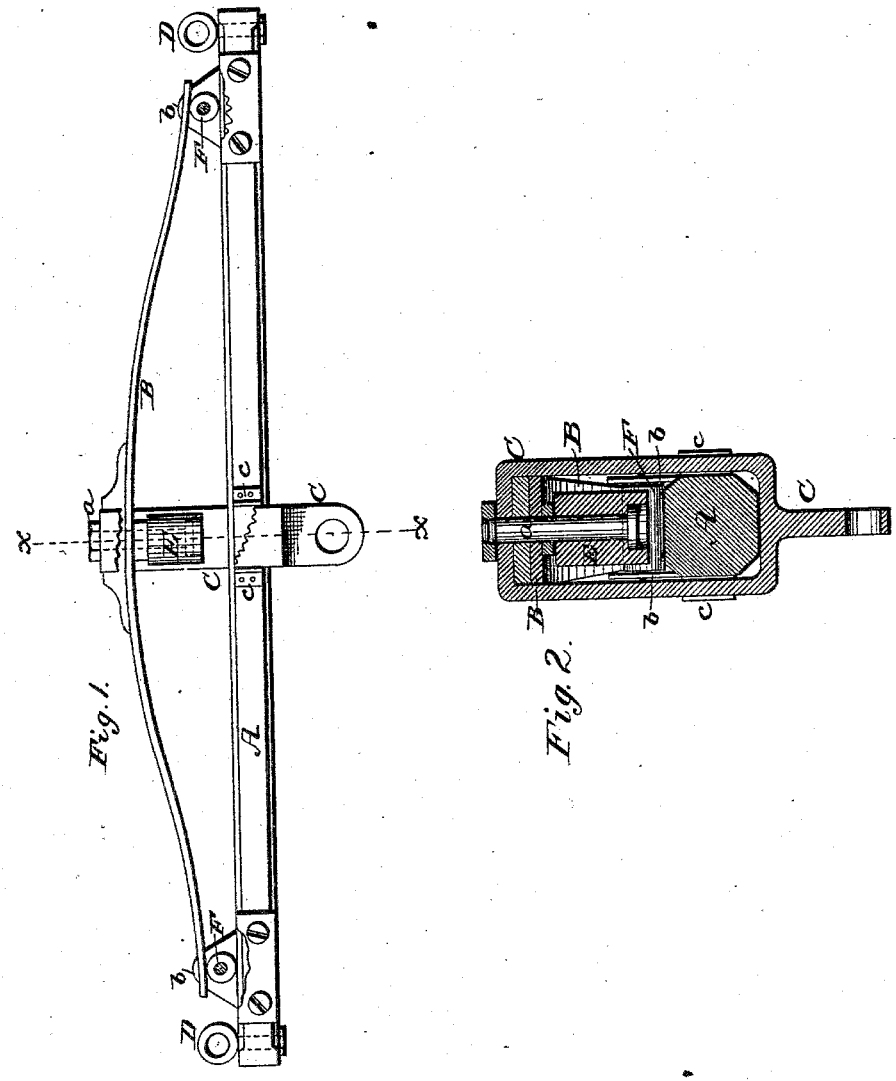
WITNESSES.
INVENTOR.
Samuel R. Ames,
by Dodge & Son,
Attys.
N. PETERS. Photo-Lithographer, Washington, D. C.

UNITED STATES PATENT OFFICE.

SAMUEL ROBERT AMES, OF LOUISVILLE, KENTUCKY, ASSIGNOR OF ONE-HALF TO FRANCIS W. STEEDMAN, OF SAME PLACE.

WHIFFLETREE.

SPECIFICATION forming part of Letters Patent No. 283,454, dated August 21, 1883.

Application filed June 28, 1883. (No model.)

*To all whom it may concern:*

Be it known that I, SAMUEL ROBERT AMES, of Louisville, in the county of Jefferson and State of Kentucky, have invented certain Improvements in Whiffletrees, of which the following is a specification.

My invention relates to that class of whiffletrees in which a spring is employed to relieve the horses from the shock which otherwise is liable to be produced at the commencement of a pull; and the improvement consists in a novel arrangement of such spring, as will be hereinafter more fully explained.

In the accompanying drawings, Figure 1 represents a top plan view of my improved whiffletree, and Fig. 2 a section of the same on the line x x.

Springs have hitherto been applied to whiffletrees in a variety of ways for the purpose of taking up the shock or jar occasioned by the sudden starting of a horse or team; but the construction which I am about to describe is believed to possess advantages over former plans both in ease of action and in strength.

Referring again to the drawings, A indicates a whiffletree-bar, single or double, as the case may be, formed of wood or other suitable material, and of about the usual weight or a little less; B, the spring; C, the clevis or yoke by which the whiffletree is attached to the vehicle; and D, the usual hooks or eyes for the attachment of the traces, or, in case of a double-tree, for the attachment of the single-trees.

The spring consists, preferably, of a single flat strip of steel nearly as long as the bar A, curved or bowed, and reduced in width and thickness from the middle toward the ends.

The yoke or clevis C is formed with an eye to receive the usual fastening pin or bolt, and is made to pass around the bar and spring, and is secured to the spring at the mid-length of the latter, so as to cause an equal pressure to be sustained by both halves of the spring.

E represents a rubber or other elastic cushion to limit the compression of the spring and to serve as an adjunct thereto to cause the pull to come gradually upon the bar as the spring is straightened, the rubber permitting a certain amount of play and compression, but being brought into action in connection with and in addition to the metal spring, and consequently causing a gradually-increasing elastic resistance to be exerted.

The cushion may be attached to the spring by the bolt *a*, which connects the yoke or clevis C therewith, as shown; or it may simply have its its end seated in a socket and held by the expansion of the rubber therein, by cement, or in any other usual and convenient way of attaching rubber to metal.

F F represent two rollers, one near each end of the bar A and in position to support the ends of the spring B, as shown in Fig. 1, the rollers being arranged to turn on vertical axles at the front side of the whiffletree. The rollers may be formed with a narrow flange at each end, or the axle-supports *b* may be extended beyond the peripheries of the rollers to prevent the ends of the springs from becoming misplaced, though the yoke or clevis, having a wide bearing upon the upper and lower faces of the bar A, will in a great measure tend to prevent such misplacement. The rollers cause the ends of the spring to move freely and prevent the friction common to other constructions in which a flat spring is employed, and consequently avoiding all liability of the spring to catch or stick at one end, and thereby cause the cramping or binding of the yoke or clevis. The spring, being quite strong, and extending nearly to the ends of the bar A, materially adds to the strength of the whiffletree as a whole.

Suitable guides, *c*, will be provided to prevent lateral play of the yoke or clevis C.

It will be observed that no bolt, pin, or other device passes through the bar A at its middle, and that consequently the full strength of the bar is preserved.

The rollers may in some cases be applied to the ends of the spring; but the construction shown and described is preferred.

Having thus described my invention, what I claim is—

1. In combination with bar A, spring B, and yoke C, rollers F F, interposed between the spring and the bar, substantially as and for the purpose set forth.

2. In combination with bar A, spring B, yoke C, and rollers F F, cushion E, interposed between the spring and bar, for the purpose explained.

3. The herein-described whiffletree, consisting of bar A, spring B, yoke C, cushion E, rollers F F, and guides c, all combined and arranged to operate substantially as shown and described.

SAMUEL ROBERT AMES.

Witnesses:
 JAS. E. SLATER,
 HERMAN KRAMER.